(12) United States Patent
Nolan et al.

(10) Patent No.: US 11,727,630 B2
(45) Date of Patent: Aug. 15, 2023

(54) DISTANCE DRIVEN DIGITAL DISPLAY EMULATION

(71) Applicant: MSG Entertainment Group, LLC, New York, NY (US)

(72) Inventors: William Andrew Nolan, Los Angeles, CA (US); Michael Romaszewicz, New York, NY (US); Michael Rankin, New York, NY (US)

(73) Assignee: MSG Entertainment Group, LLC, New York, NY (US)

( * ) Notice: Subject to any disclaimer, the term of this patent is extended or adjusted under 35 U.S.C. 154(b) by 0 days.

(21) Appl. No.: 17/490,387

(22) Filed: Sep. 30, 2021

(65) Prior Publication Data

US 2023/0095225 A1 Mar. 30, 2023

(51) Int. Cl.
*G06F 3/14* (2006.01)
*G06T 15/50* (2011.01)

(52) U.S. Cl.
CPC .......... *G06T 15/50* (2013.01); *G06T 2210/36* (2013.01)

(58) Field of Classification Search
CPC .... G06F 3/1446; G06F 3/147; G06F 3/04815; G09G 2320/0261; G09G 2320/028; G09G 2354/00; G09G 3/003; G09G 2320/068; G09G 2340/10; G09G 3/002; G09G 2320/0686; G09G 2360/141; G06T 15/20; G06T 15/50; G06T 2210/36
See application file for complete search history.

(56) References Cited

U.S. PATENT DOCUMENTS

2016/0261837 A1 * 9/2016 Thompson ........... H04N 13/373

OTHER PUBLICATIONS

NanoLumens, "Distance Infographic," 2021, available from: https://www.nanolumens.com/distance-infographic/; 2 pages, Retrieved Oct. 12, 2021.
Haynes, Dave, "The Rule of Thumb for Direct-View LED Viewing Distances is All Over the Place," Sixteen: Nine, Sep. 29, 2017, available from: https://www.sixteen-nine.net/2017/09/29/the-rule-of-thumb-for-direct-view-led-viewing-distances-is-all-over-the-place/; 10 pages, Retrieved Oct. 12, 2021.

* cited by examiner

*Primary Examiner* — Hau H Nguyen
(74) *Attorney, Agent, or Firm* — Sterne, Kessler, Goldstein & Fox P.L.L.C.

(57) ABSTRACT

Disclosed herein are system, method, and computer program product embodiments for utilizing non-RAM memory to implement large digital display emulations. An embodiment operates by generating, by an emulator device, a pixel map of a digital display, wherein the pixel map comprises a plurality of pixels representative of a plurality of light emitting elements arranged on a viewable surface of the large digital display. A distance and orientation of a virtual viewer to the viewable surface of the large digital display is generated and the emulator device emulates the large digital display based on the pixel map and the distance and the orientation of the virtual viewer and renders the digital content based on the emulated large digital display.

20 Claims, 10 Drawing Sheets

DISTANCE DRIVEN DIGITAL DISPLAY EMULATION

BACKGROUND

Electronic displays (televisions, computer monitors, cell phone screen, etc.) are constructed with individual pixels. Typically, the resolution of these displays is such that individual pixels are not identifiable and any image shown on the display screen appears to a viewer as one continuous image. However, for large (or very low resolution) digital display screens, individual pixels may be identifiable, depending on the distance between the screen and the viewer. This is commonly observed with large displays such as billboards, "jumbotrons" and scoreboards. The pixels on these screens are commonly made up of many individual light emitting diodes (LEDs). Although many improvements have been made to the quality of these large digital displays, there remains some separation between the individual LEDs (or groups of LEDs), and so at some distance, the individual pixels of an LED display will be identifiable. This distance is known as the Visual Acuity Distance (VAD).

One common approach to rendering an image on a large display is to use lower resolution content to approximate a digital display. Another example approach is to simply show the input content unmodified. However, these common approaches may fail to render high quality imagery for large displays.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for realistic visual emulation of large digital displays. In computing, an emulator is hardware or software that enables one computer system (called the host) to emulate (simulate) another program or device. In some embodiments, an emulator emulates a large display and renders an image or video onto the emulated large display.

When a content provider prepares content, such as images or video for a large screen, they may desire to see what a final rendering might look like on the large display before actually applying the imagery to the large display. As previously discussed, large displays may have fixed spaces between pixels or have variable spacing between pixels. Prior rendering techniques may not account for this spacing and therefore sacrifice quality or be distorted. In some embodiments, large digital displays may vary pixel placements across a display surface. For example, a large digital display surface may include a higher density of display elements in areas of desired higher resolution (e.g., video playback section). Alternately, or in addition to, the same large digital display may include a lower density of display elements in areas of desired lower resolution (e.g., scores, borders, blank areas, etc.). In an exemplary embodiment, a large spherical digital display may arrange the display elements in varying densities from the horizontal center line outward to the top or bottom edges of the sphere (e.g., highest density to lowest). However, it should be understood that any arrangement of display elements with any spacing may be substituted without departing from the scope of the technology described herein.

By emulating a target digital display, the presentation of the content may be prepared in advance, off-site, and be adjusted for differing display footprints and shapes. Emulating the large display and applying the imagery thereto provides a platform for visualization of the content end product.

The technology described herein, in some embodiments, largely centers around emulation by creating an accurate map of an LED layout for a large digital display, known as a "pixel map". In an exemplary embodiment, large digital displays may include LEDs or groups of LEDs that are irregularly arranged or spaced. For example, LEDs may be grouped together in an enclosure and multiple enclosures grouped together to form pixels. Precisely mapping these pixels by recognizing the LEDs or groups of LEDs included in each pixel and their relative spacing (position) on the large digital display may, in some embodiments, provide a realistic representation on an emulator computer screen. The realistic representation provides the content provider with a snapshot of what an image rendered to the target large digital display would look like.

In some embodiments, large digital displays may contain varying numbers of LEDs or groups of LEDs combined to represent a single pixel. In some embodiments, large LED screen displays are emulated by interpolating between an accurate pixel map and a continuous image based on a viewer's acuity distance. For example, pixel spacing may vary for any irregular large display surface or large digital display with a combination of geometric shapes. For example, for a large spherical digital display, pixel spacing at the center of the display may be different from pixel spacing at the top or bottom of the spherical display. In another example, a large digital display with a partial flat display section in combination with a partial spherical display section may have different pixel mappings for each partial section as well as for transition areas between partial sections. In yet another example, angled surfaces may have varying pixel arrangements to account for an angle of incidence of a field of view to a potential viewer.

The technology described herein, in some embodiments, further modifies an emulated image to further account for a reduction of brightness based on a viewer's angle to a surface of a large display. LEDs have unique properties that affect how a displayed image appears to a viewer. Specifically, LEDs have a luminance or brightness value (measured in NITs) and a Viewing Angle (measured in degrees). NIT comes from the Latin "Nitere", which means "to shine." One NIT is equivalent to one Candela ($cd/m^2$). These two properties (luminance and viewing angle) are closely related to each other. Essentially, a viewable brightness of a single LED diminishes based on an increasing viewer angle from a centerline of the LED. For example, a viewing angle of 35 degrees from a centerline of a LED will result in a viewable brightness decrease by 50%. This example is for a typical LED, however, a viewing angle may change from diode-to-diode based on design, materials and manufacturing techniques.

Figure 1:
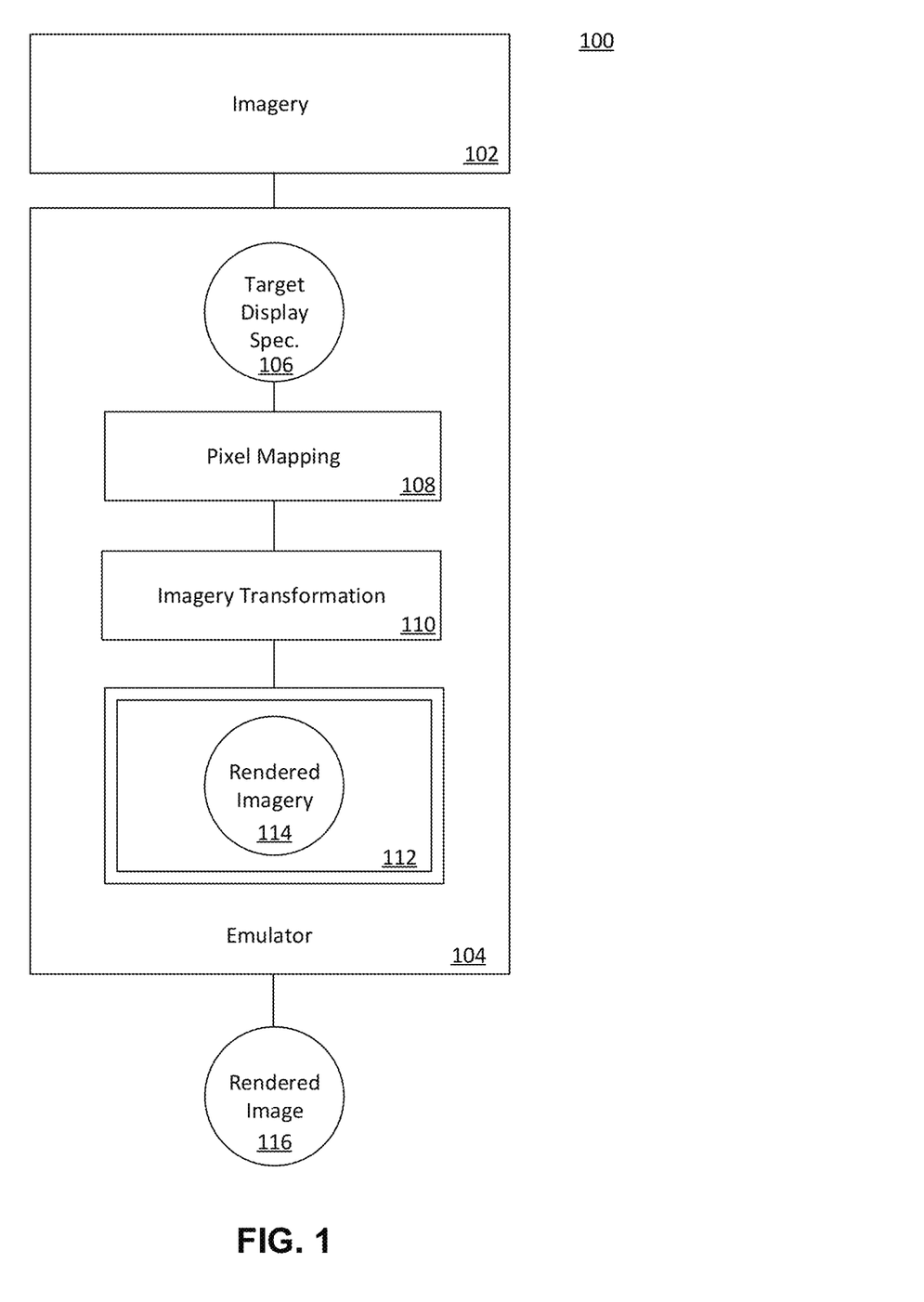
FIG. 1 illustrates a system for large digital display emulation, according to some embodiments.

FIG. 1 illustrates a system 100 for large digital display emulation, according to some embodiments. While the following embodiments will be described emulating large light emitting diode (LED) displays, it is to be understood that other technologies may be substituted without departing from the scope of the technology described herein. For example, known display technologies include, but are not limited to, liquid crystal diode (LCD), Quantum dot LED (QLED), Organic LED (OLED), plasma, Digital Light Processing (DLP), etc. In addition, future display technologies may be substituted for the described LEDs without departing from the scope of the technology described herein.

A light-emitting diode (LED) is a semiconductor light source that emits light when current flows through it. Electrons in the semiconductor recombine with electron holes, releasing energy in the form of photons. The color of the light (corresponding to the energy of the photons) is determined by the energy required for electrons to cross the band gap of the semiconductor. White light is obtained by using multiple semiconductors or a layer of light-emitting phosphor on the semiconductor device.

Figure 3:
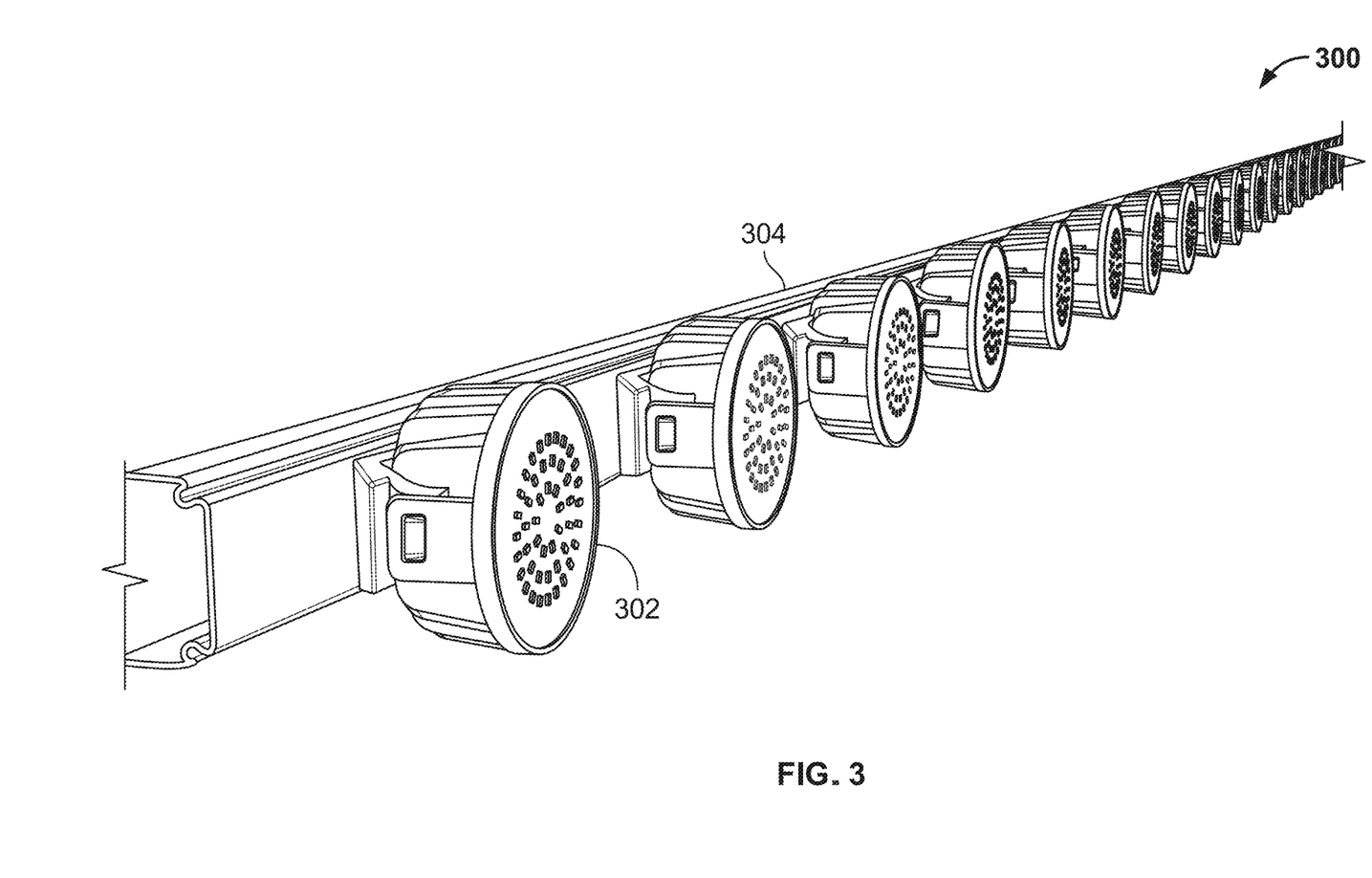
FIG. 3 illustrates a display showing an LED assembly for a large digital display, according to some embodiments.

In digital imaging, a pixel (or picture element) is the smallest item of information in an image. Pixels are commonly arranged in a 2-dimensional grid, and represented using squares. Each pixel is a portion of an original image, where more portions typically provide more-accurate representations of the original image. In large displays, each pixel may include at least three independent LEDs (red, green, blue), located behind a diffuser. In some embodiments, because of spacing between display elements, large displays may group together many LEDs. For example, 48 LEDs may be grouped together in concentric circles in an enclosure (as shown in FIG. 3, element 302) and multiple enclosures may be grouped together to form a pixel. However, other configurations are possible as would be evident to one skilled in the art. In some embodiments, large digital displays may be constructed, for example, of thousands, tens of thousands, hundreds of thousand or even millions of pixels.

For the sake of simplicity, the following disclosure will discuss an emulator 104 as performing the processing steps. However, a person of ordinary skill would readily understand that a local processor (e.g., server), one or more remote processors (e.g., cloud systems), distributed servers, server groups, crowd-sourced processing or other equivalent known or future processing architectures may perform the processing steps. Emulator 104 may provide an emulation of hardware, software or both.

Imagery 102 (display content) may be any digital content, such as an image, video, television, commercial, advertisement, photograph, etc. Imagery 102 may be pre-stored data, streamed data, live or recorded broadcast data, etc.

Emulator 104 may benefit from an understanding of a large digital display's structural aspects (e.g., location, size, shape, viewing angles, expected audience viewing distances, display elements (e.g., LEDs), pixel structures and placements, etc.). Accordingly, target display specifications 106 may include data relating to the structural aspects of the large digital display devices (e.g., LEDs or groups of LEDs). These structural aspects may include, but limited to, a current location noted as a geographical position on a defined real-world plane (e.g., a specific location on a wall), a display resolution (e.g., 720p, 1080p, 2K, etc.), a physical size (e.g., 50 ft, 100 ft, 500 ft, etc.), a viewing distance (e.g., <10 ft, 10-600 ft, >600 ft, etc.), a technology type (e.g., an LED, liquid crystal display (LCD), an organic light-emitting diode display (OLED), a plasma display panel (PDP), etc.), and a display type (e.g., two-dimensional), spherical, angled, multi-dimensional. The emulator may also benefit from data related to external atmospheric elements including ambient light levels, particulate matter in the viewing medium (aka pollution) and time of day (ambient light levels). For example, a brightness level may be adjusted to account for nighttime conditions.

Figure 4:
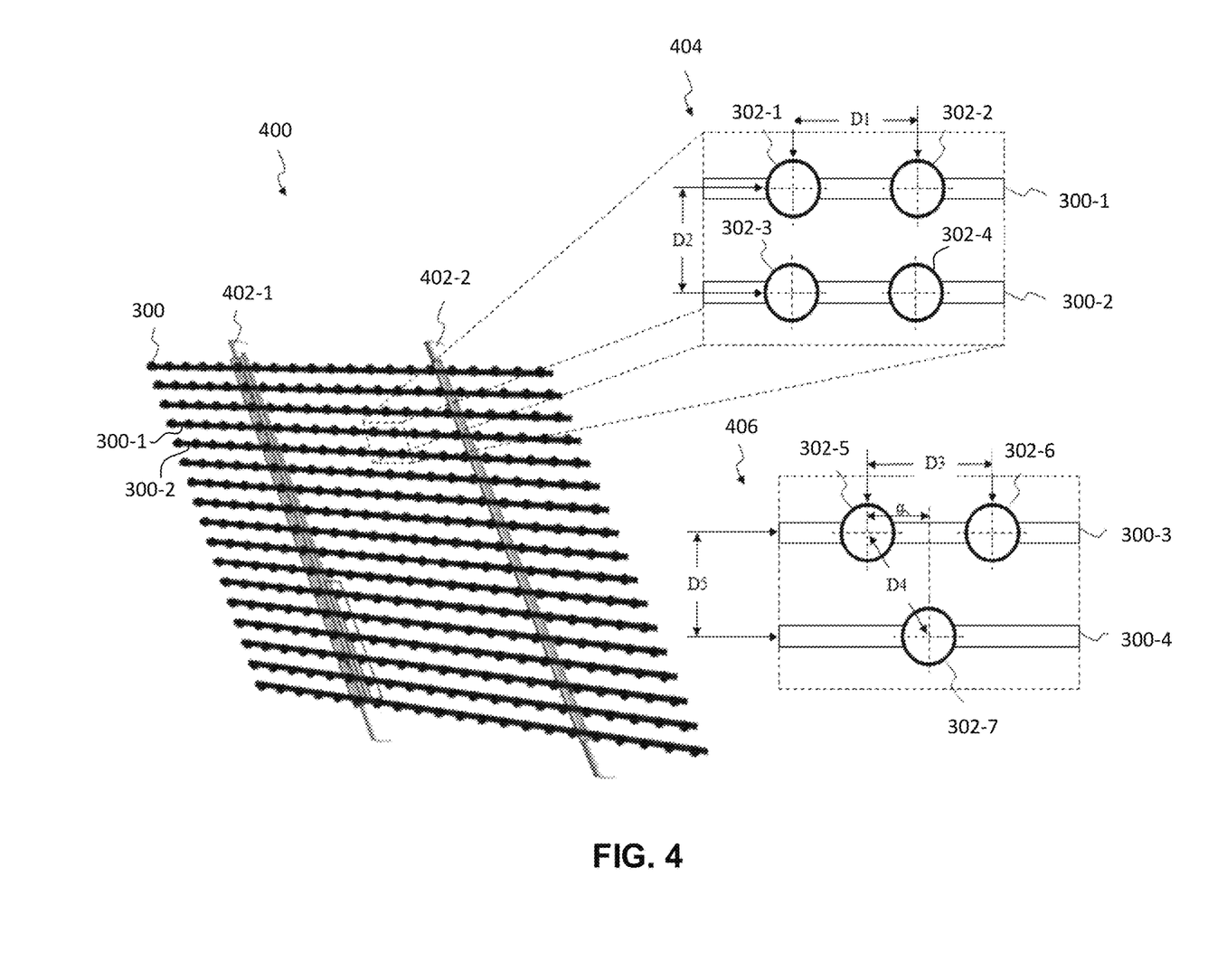
FIG. 4 illustrates pixel maps showing a multiple pixel section of a large digital display panel, according to some embodiments.

The technology described herein describes emulating a large display. In some embodiments, an emulator maps real screen pixels (that is the pixels on the computer screen, headset or other device the viewer is using in the real world) to virtual screen pixels (that is the screen in the virtual environment being emulated). In practice, this means emulating an LED screen on another LED screen, but this could be any light-emitting element. The emulator models characteristics (including physical spacing) of a large screen. In addition, data from the target display specifications relating to relationships between the display devices (LEDs), arranged as pixels, is used as an input to pixel mapping 108. Pixel mapping identifies a number and arrangement of display elements in each pixel and an arrangement (location and spacing) of each pixel on a surface of the large digital display. For a set of display elements, the pixel map may include a relative distance between each of the display devices in each set. For example, as shown in FIG. 4, a distance (e.g., D1-D4) between the adjacent display devices is included in the pixel map. Based on the specific arrangements and distances between adjacent display devices and the size of the display devices, the emulator 104 determines a configuration of the set of display devices (e.g., a number of rows and columns).

Once the structural aspects are known, an original content imagery may be fit to the pixel map. The emulator is configured to provide a realistic emulation of the display. However, in some aspects, some image processing of the original content may be needed. For example, the user may have original content that is of a much higher resolution than the eventual display's resolution. In this example, the resolution of the content may be lowered, as pixels cannot be added to the screen. In one aspect, adjustments to the input image may also include reducing the resolution in advance of fitting the content imagery to the pixel map or adjusting color levels depending on a color gamut of the eventual display.

As will be discussed in greater detail hereafter (FIGS. 5-8), display content is transformed to match an imagery format, the pixel map and expected audience viewer distance and/or angle to the display surface.

During rendering (drawing of the imagery), the transformed display content is applied to the emulated large digital display and shown (computer display 112) as a rendered image 114 on a virtual representation of the target digital display. For example, as shown, the display content is shown on a virtual large spherical digital display. The emulation can be subsequently modified and rendered for varying audience-viewing distances/angles to provide the content provider or operator of the large digital display an opportunity to test different media display content and observe how the display content would appear in real life on a target large digital display. The rendered display content data files may be of a virtual environment 114 or a real-world environment 116.

Figure 2:
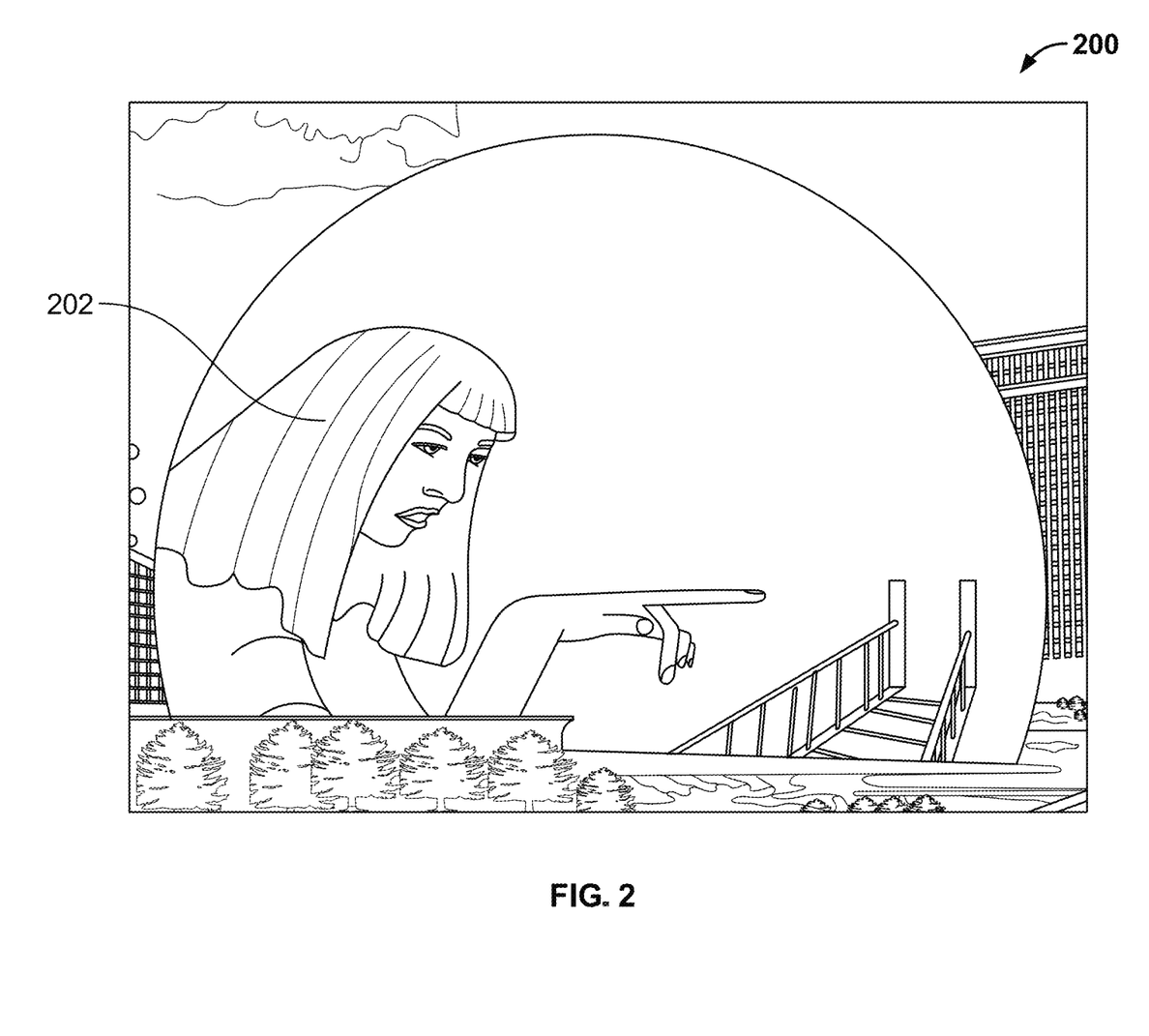
FIG. 2 illustrates a perspective view of an exemplary exterior display system for displaying visual media, according to some embodiments.

FIG. 2 illustrates a perspective view of an exemplary exterior large digital display system for displaying visual media according to some embodiments of the disclosure. In the exemplary embodiment illustrated in FIG. 2, an exterior display system 200 may be configured and arranged to present visual media 202, such as images, pictures, graphics, informational content, live images, moving images, videos, animations, advertisements, promotional content, movies, scenery, light displays and effects, among others. In some embodiments, the exterior display system 200 may include a large digital display device 204 that is configured and arranged around a building structure and/or a non-building structure, or a portion of the exterior surface of the building structure and/or the non-building structure. For example, the large digital display device 204 may be configured and arranged around an exterior surface of a building structure and/or a non-building structure, or a portion of the exterior surface of the building structure and/or the non-building structure. For convenience, the building structure and/or the non-building structure is not illustrated in FIG. 2.

In the exemplary embodiment illustrated in FIG. 2, the building structure and/or the non-building structure may include, be connected to, and/or be surrounded by a mechanical supporting structure configured and arranged about its exterior surface or a portion of its exterior surface. The mechanical supporting structure may be characterized as providing a mechanical lattice framework for forming the large digital display device 204. As to be described in further detail below, the large digital display device 204 may be implemented using multiple electronic visual display panels. Each of these multiple electronic visual display panels may include one or more interconnected modular electronic visual display panels having multiple groups of multiple light-emitting diodes (LEDs), also referred to electronic LED disc assemblies (FIG. 3), that are configured and arranged in a series of one or more rows and/or a series of one or more columns. In some embodiments, each electronic LED disc assembly may be characterized as forming a pixel of the large digital display device 204. In some embodiments, multiple LED disc assemblies may be grouped together to form a pixel (FIG. 4).

In some embodiments, the large digital display device 204 may include 200,000 to 2,000,000 electronic LED disc assemblies, 500,000 to 1,500,000 electronic LED disc assemblies, or 750,000 to 1,250,000 electronic LED disc assemblies, which equates to 200,000 to 2,000,000 pixels, 500,000 to 1,500,000 pixels, or 750,000 to 1,250,000 pixels. In some embodiments, a maximum brightness of the large digital display device 204 may be in a range of 4,000 nits/ft$^2$ to 6,000 ft$^2$, 4,500 nits/ft$^2$ to 5,500 nits/ft$^2$, or 4,800 nits/ft$^2$ to 5,200 nits/ft$^2$ to ensure that the electronic visual display device 204 is visible during periods of bright sunlight.

As to be described in further detail below, multiple electronic visual display panels may be connected to the mechanical supporting structure to form the electronic visual display device 204. In some embodiments, the mechanical supporting structure may be configured and arranged to effectively shape the large digital display device 204 to be spherical, or spherical-like, in shape as illustrated in FIG. 2. However, those skilled in the relevant art(s) will recognize that the mechanical supporting structure may be configured and arranged differently to cause the large digital display device 204 to be any suitable three-dimensional shape, or shape, without departing from the spirit and scope of the present disclosure. This suitable three-dimensional shape, or shape, may include a cube, a rectangular prism, a cone, a cylinder, and/or any combination thereof to provide some examples. In some embodiments, the large digital display device 204 may have a substantially similar shape as the building structure and/or the non-building structure. For example, the mechanical supporting structure may be connected to a building structure and/or non-building structure having a spherical or spherical-like, shape. In this example, the mechanical supporting structure may be configured and arranged to effectively shape the large digital display device 204 to be similarly spherical, or spherical-like, in shape as the building structure and/or the non-building structure. In some embodiments, the large digital display device 204 may have a different shape than the building structure and/or the non-building structure. For example, the mechanical supporting structure may surround a building structure and/or non-building structure having a rectangular prism, or rectangular prism-like, shape. In this example, the mechanical supporting structure may be configured and arranged to effectively shape the electronic visual display device 204 to be spherical, or spherical-like, in shape, which is different from the shape of the building structure and/or the non-building structure. Generally, the building structure refers to any suitable structure, or structures, which are designed for human occupancy and may include one or more residential, industrial, and/or commercial building structures.

FIG. 3 graphically illustrates an exemplary row of electronic LED disc assemblies that may be implemented within the electronic visual display panels according to some embodiments of the disclosure. FIG. 3 graphically illustrates a simplified exemplary electronic visual display device 300 that may implemented within the exemplary exterior display system 204 according to some embodiments of the disclosure. As described above, the electronic visual display device 300 may be implemented using multiple electronic visual display panels. The electronic visual display panel may include multiple electronic LED disc assemblies (enclosures), such as the electronic LED disc assemblies 302 (e.g., 48 LEDs arranged in concentric circles), which are configured and arranged as a series of rows and/or a series of columns to form an array of electronic LED disc assemblies. The discussion of FIG. 3 to follow is to describe an exemplary row of electronic LED disc assemblies 300 from among the series of rows of the array of electronic LED disc assemblies. The row of electronic LED disc assemblies 300 may represent an exemplary embodiment of the one of the series of m-rows of the electronic LED disc assemblies as described below in FIG. 4.

In the exemplary embodiment illustrated in FIG. 3, the row of electronic LED disc assemblies 300 includes a plurality of electronic LED disc assemblies 302 that are connected to carrier rail structure 304. The carrier rail structure 304 may represent an exemplary embodiment of one or more of the connected carrier rail structures as shown in above in FIG. 4. In some embodiments, the rails may be straight, curved or include multiple angles.

In an exemplary embodiment illustrated in FIG. 4, a modular display panel 400 may include a plurality of carrier rail structures 300 that are connected to one or more visual display device mounting structures 402-1 and 402-2. In some embodiments, the electronic LED disc assemblies 302 may be configured and arranged as a series of m-rows and/or a series of n-columns to form an array of electronic LED disc assemblies. Although the modular display panel 400 and is illustrated as being a rectangle in FIG. 4, those skilled in the relevant art(s) will recognize that the modular display panel 400 may be configured and arranged to be other geometric shapes, such as quadrilaterals, squares, and/or polygons, and/or any other suitable shapes that will be apparent to those skilled in the relevant art(s) without departing from the spirit and scope of the present disclosure.

In some embodiments, a single electronic LED disc assembly (containing multiple LEDs) from among the electronic LED disc assemblies may be characterized as forming a pixel of the large digital display device 204. In some embodiments, a pixel may include a grouping of multiple LED disc assemblies (each with multiple LEDs). A pixel map is configured to record a number and arrangement of LEDs, number of assemblies forming each pixel, their location relative to adjacent LED assemblies, their location within a single modular display panel, and/or their positioning on the large digital display surface (e.g., geographic earth coordinates).

As illustrated in a first LED assembly arrangement 404, adjacent, neighboring electronic LED disc assemblies along a corresponding carrier rail structure, for example, from among the carrier rail structures 300, such as electronic LED assembly 302-1 and 302-2 from carrier rail structure 300-1 and electronic LED assembly 302-3 and 302-4 from along a carrier rail structure 300-2, are separated, or spaced-apart, by a one-dimensional center-to-center distance D1 along the x-axis of the Cartesian coordinate system. And adjacent, neighboring electronic LED assemblies along adjacent, neighboring carrier rail structures such as the electronic LED assembly 302-1 along the carrier rail structure 300-1 and an electronic LED assembly 302-3 along a carrier rail structure 300-2, are separated, or spaced-apart, by a one-dimensional center-to-center distance D2 along the y-axis of the Cartesian coordinate system. In some embodiments, the center-to-center distance D1 and the center-to-center distance D2 may be selected from a range between approximately 100 millimeters (mm) to approximately 300 mm, a range between approximately 140 mm to approximately 274 mm, and/or a range between approximately 200 mm to approximately 240 mm. In some embodiments, the center-to-center distance D1 and the center-to-center distance D2 may be approximately equal to each other.

Alternatively, or in addition to, the modular display panel 400 may be characterized as including a second configuration and arrangement 406 of the electronic LED disc assemblies 302-5, 302-6 and 302-7. As illustrated, adjacent, neighboring electronic LED disc assemblies along a corresponding carrier rail structure, for example, a carrier rail structure 300-3, from a plurality of carrier rail structures 300, includes an electronic LED assembly 302-5 and an electronic LED assembly 302-6. In this example, these LED assemblies, are separated, or spaced-apart, by a one-dimensional center-to-center distance D3 along the x-axis of the Cartesian coordinate system. And adjacent, neighboring electronic LED assemblies along adjacent, neighboring carrier rail structures from among the carrier rail structures 300, such as the electronic LED assembly 302-5 along the carrier rail structure 300-3 and an electronic LED assembly 302-7 from among the electronic LED assemblies along a carrier rail structure 300-4, are separated, or spaced-apart, by a two-dimensional center-to-center distance D4 along the x-axis and y-axis of the Cartesian coordinate system. In some embodiments, the center-to-center distance D3 and the center-to-center distance D4 may be selected from a range between approximately 100 millimeters (mm) to approximately 300 mm, a range between approximately 140 mm to approximately 274 mm, and/or a range between approximately 200 mm to approximately 240 mm. In some embodiments, the center-to-center distance D4 and the center-to-center distance D4 may be approximately equal to each other. As further illustrated in FIG. 4, neighboring carrier rail structures from among the carrier rail structures 300, such as the carrier rail structure 300-3 and the carrier rail structure 300-4 are separated, or spaced-apart, by a two-dimensional center-to-center distance D4 along the x-axis and y-axis of the Cartesian coordinate system. In some embodiments, the center-to-center distance D4 may be approximated by:

$$D_4 = \sqrt{D_4^2 - \alpha^2}, \qquad (1)$$

where α denotes a horizontal distance, for example as shown, from the electronic LED disc assembly 302-5 to a vertical line normal from the electronic LED disc assembly 302-7.

While example spacings have been described above in the above examples, it should be recognized that other spacings and arrangements may be implemented without departing from the scope of the technology described herein. For example, it is known to relate pixel pitch (space between pixel elements) and distance. For example, standard visual acuity (20/20) relates to person's ability to discern two points separated by one arc minute—about 300 pixels per inch at 25 cm. By way of a non-limiting example, a 10 foot wide High Definition (HD) display may have a pixel pitch of 1.5875 mm and would look good (no spacing between pixels detected) to an observer from 5-7 feet. In another non-limiting example, a 20 foot wide High Definition display may have a pixel pitch of 3.175 mm and would look good from 12-18 feet. One skilled in the art will recognize that different manufacturers of displays may provide different guidelines.

Figure 5:
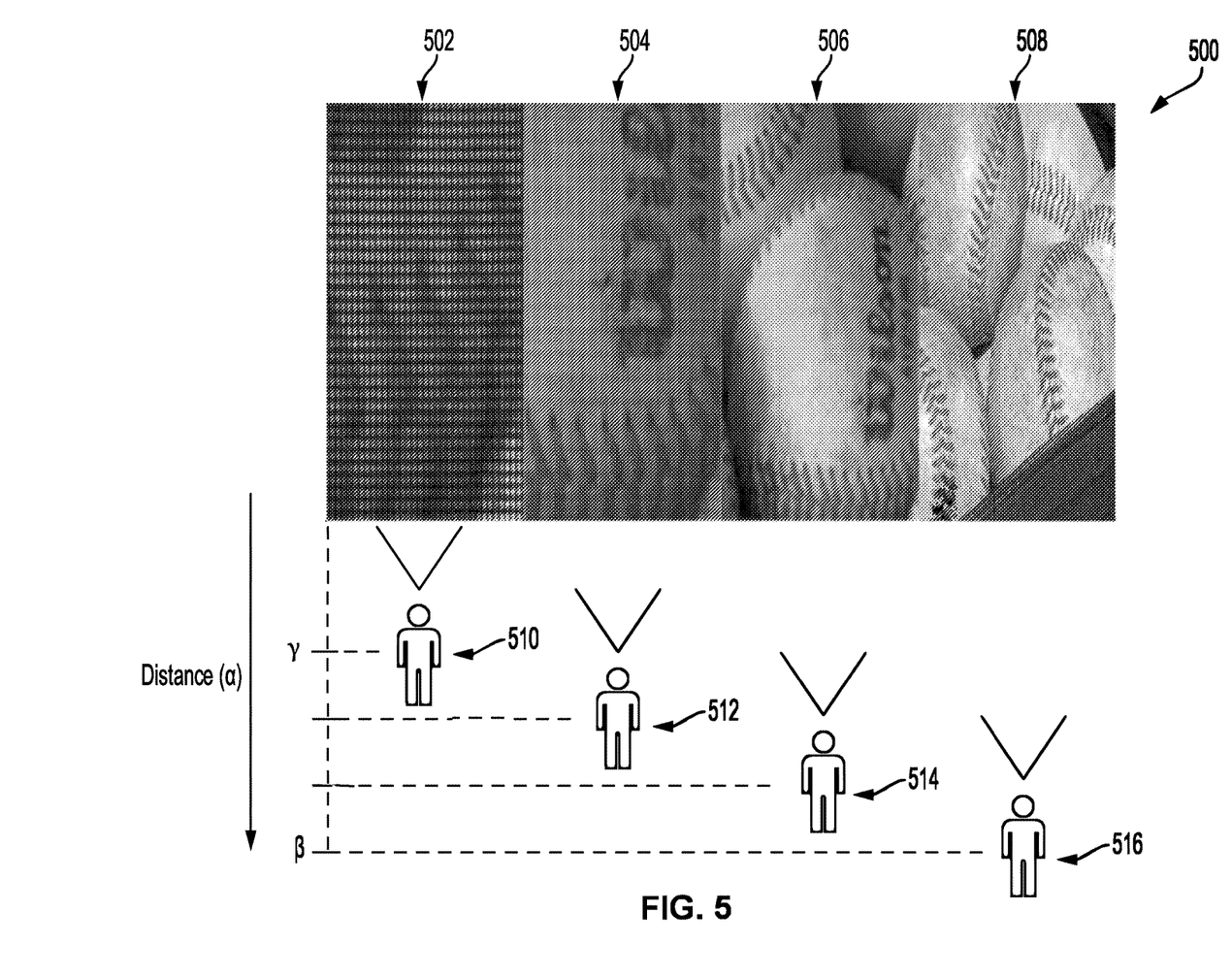
FIG. 5 illustrates an LED screen showing the same image at different distances, according to some embodiments.

FIG. 5 is a large LED screen 500 showing the same image at different distances a, according to an embodiment. At distance y, viewer 510 would be able to detect spacing between individual pixels (e.g., between individual LED assemblies) as shown in image 502. This distance is known as a Minimum Separable Acuity Distance. For example, a large display of X size (separation distance N between LED assemblies), would have a Minimum Separable Acuity Distance of approximately Y feet. As a viewer moves to positions 512 and 514, individual pixels in images 504 and 506, respectively, become less noticeable as the distance increases. At distance β, viewer 516 is unable to detect any separation between individual pixels and the image 508 appears smooth and continuous.

Figure 6:
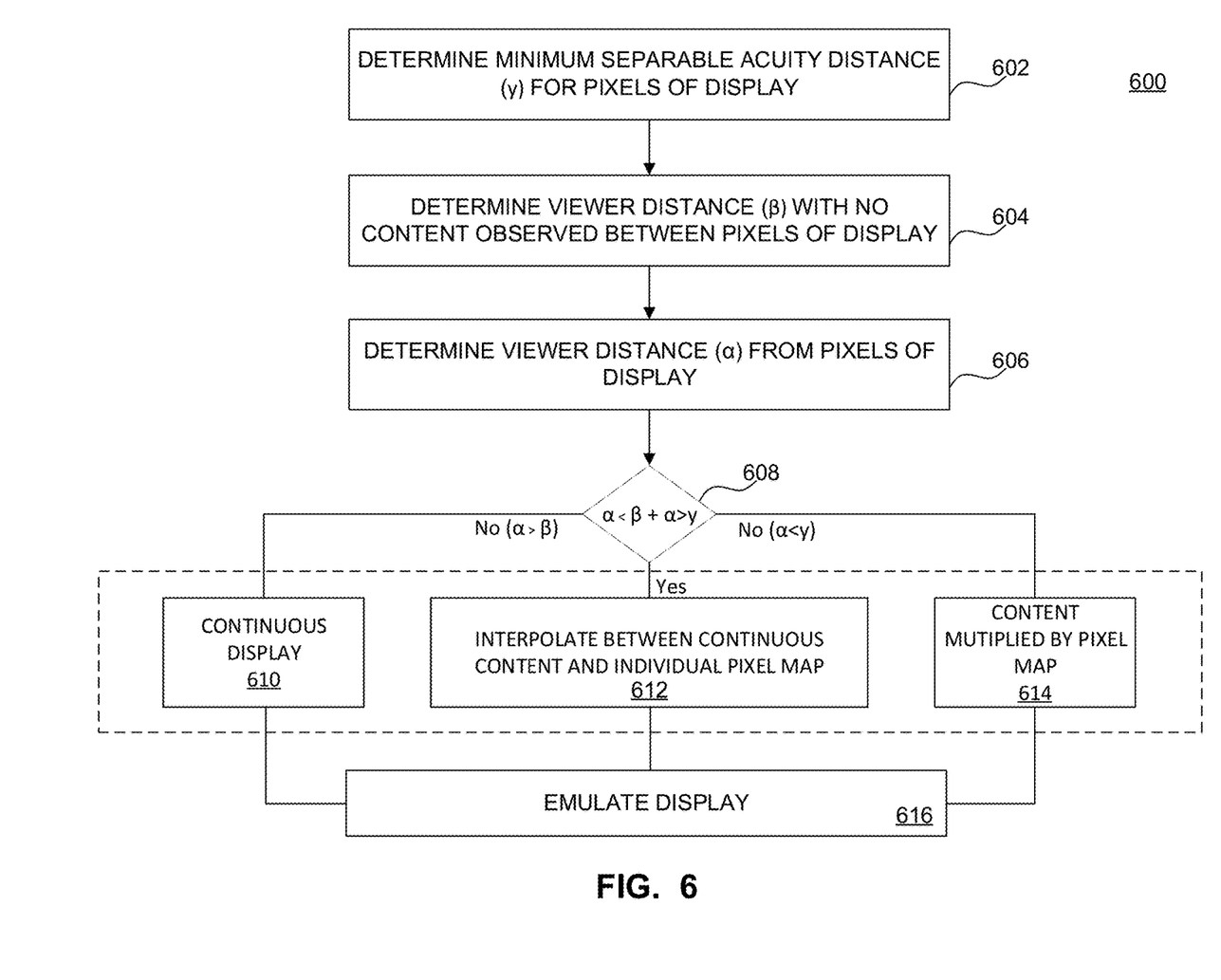
FIG. 6 illustrates a flow diagram for emulating a large digital display at different viewer distances, according to some embodiments.

FIG. 6 illustrates a flow diagram for emulating a large digital display at different viewer distances, according to some embodiments. The emulation of the large digital display is based on the previously calculated pixel map and a selected distance of a virtual viewer to a surface of the large digital display. Method 600 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

In 602, a Minimum Separable Acuity Distance $\gamma$ is determined for pixels of a target large digital display. In some embodiments, these distances are established through pre-stored data, based on real-world observation of the target large digital display, or using known visual acuity methods.

In 604, a distance $\beta$ at which no image content is observed between pixels of a target large digital display is determined. In some embodiments, these distances are established through pre-stored data, based on real-world observation of the target large digital display, or using known visual acuity methods.

In 606, a distance ($\alpha$) of a virtual viewer is determined. This virtual distance represents a real-world distance of an expected audience member viewing the display and may be varied to test various media content on a target large digital display.

In 608, $\beta$ is the Minimum Separable Acuity Distance and $\gamma$ is the distance at which no image content is observed between pixels (measured beforehand) and a is the distance of a virtual viewer from the simulated screen (measured in real time during the emulation). A determination is made if $\alpha$ is between $\gamma$ and $\beta$.

In 610, if $\alpha > \beta$ the screen is rendered as one continuous surface. The display would appear to the viewer as a continuous display with no individual pixels visible.

In 614, if $\alpha < \gamma$ the content is multiplied by the pixel map and content is only shown on the individual pixels.

In 612, if $\alpha < \beta$ but $\alpha > \gamma$ the system linearly interpolates between the continuous content and the individual pixel map with $\alpha$ as an interpolation parameter. For example, at 50% of $\beta$ the viewer would see a mixture between the original image content and the pixel-mapped content (continuously less pixel-mapped content as a increases).

In some embodiments, the system may pre-determine a plurality of variables (distance, viewing angle, etc.) for each real-world display pixel (pixel on a TV, headset, etc.) for the virtual screen pixel it covers.

Figure 7:
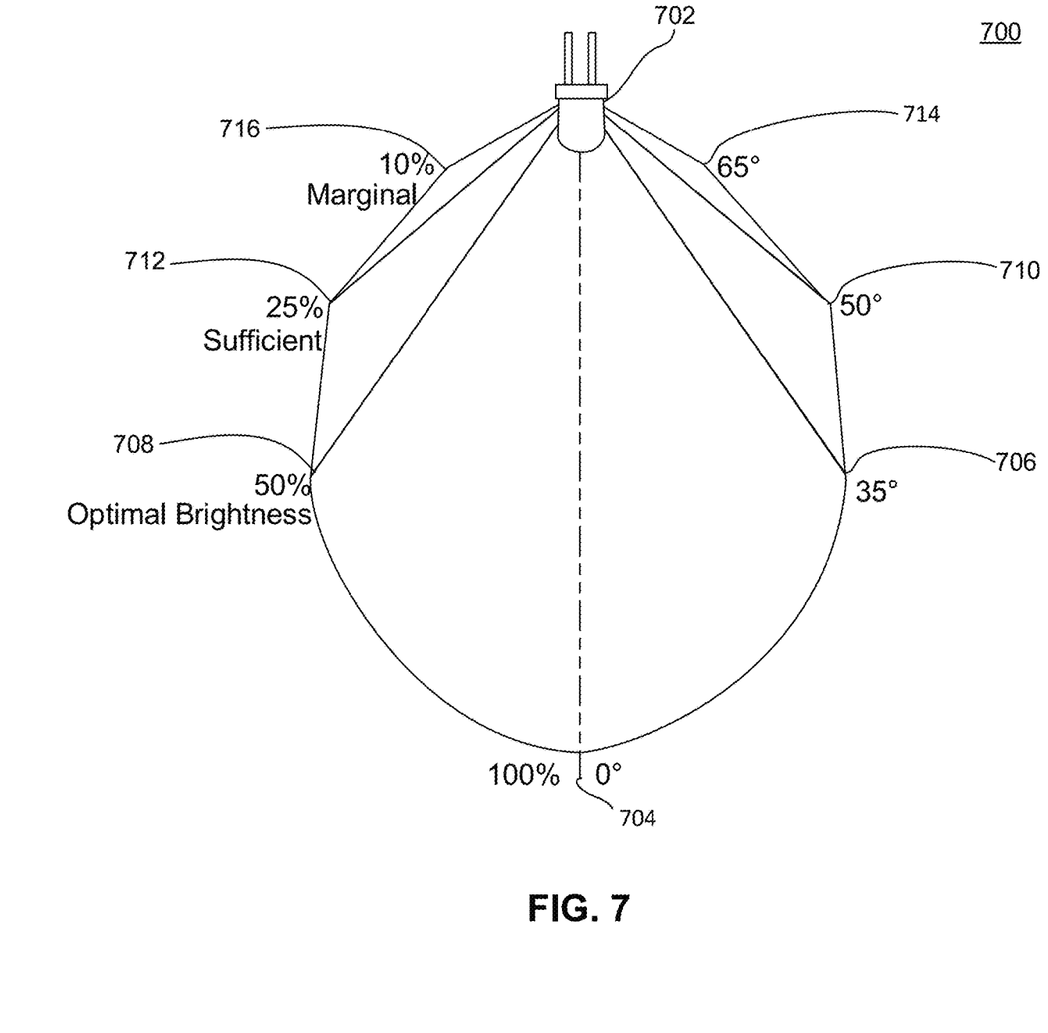
FIG. 7 is an LED viewing angle diagram, according to some embodiments.

FIG. 7 illustrates and LED 700 and brightness values at specified angles, as per some embodiments. LEDs have other unique properties that affect how a displayed image appears to a viewer. Specifically, LEDs have a brightness value (measured in NITs) and a Viewing Angle (measured in degrees). These properties are closely related to each other. Essentially the brightness of a single LED changes based on the angle from a viewer's eye to the LED. For example, a viewing angle 706 of 35 degrees from a centerline 704 of a LED 702 will result in a viewable brightness decrease by 50% (50% brightness 708). In another example, a viewing angle 710 of 50 degrees from a centerline 704 of a LED 702 will result in a viewable brightness decrease by 75% (25% brightness 712). In yet another example, a viewing angle 714 of 65 degrees from a centerline 704 of a LED 702 will result in a viewable brightness decrease by 90% (10% brightness 716).

Figure 8:
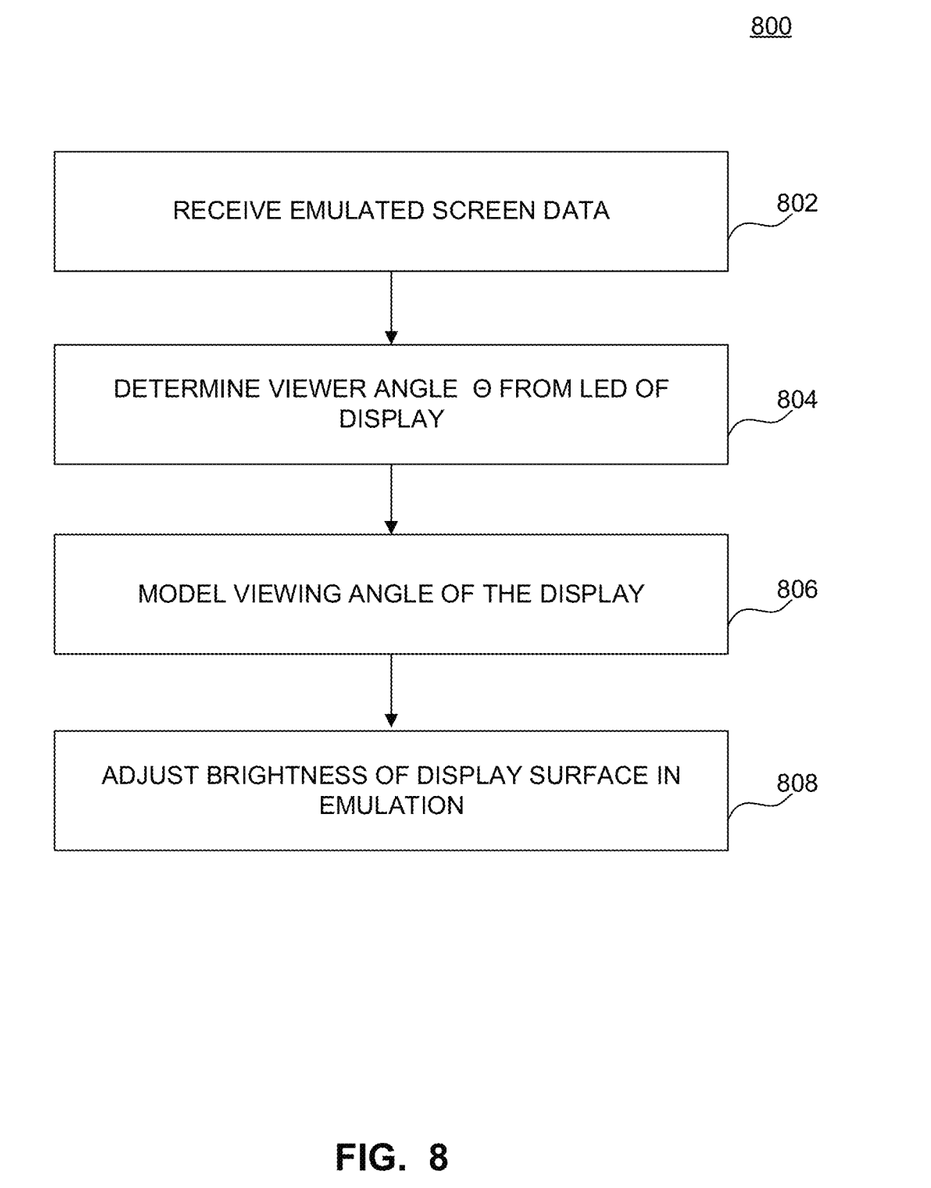
FIG. 8 illustrates a flow diagram for emulating a large digital display at different viewer angles, according to some embodiments.

FIG. 8 illustrates a method of adjusting brightness of display surfaces, as per some embodiments. To improve an emulated large digital screen, the emulation, in some embodiments, accounts for this decreasing brightness based on a virtual viewer's angle to normal of a surface of the large digital display. Method 800 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

For example, during emulation, in addition to the distance $\alpha$ from the surface of the large digital display, a virtual viewer angle $\theta$ between the virtual viewer and the physical surface covered by the screen is generated. The emulation uses $\theta$ as an input to a non-linear function modeling the viewing angle of the display, reducing the brightness of the surface respectively.

In 802, the emulated screen data is received from the earlier described large digital screen emulation. While described as a subsequent process, brightness modifications for rendering display content may performed at any part of the emulation process and for additional reasons. For example, brightness modifications could be determined before, in parallel or after the large screen emulation. In one non-limiting example, brightness modification may be performed depending on other elements, such as, if a potential viewer is wearing sunglasses, if there is extra pollution in the atmosphere this day, what if it is a cloudy day, etc.

In 804, a virtual viewer angle $\theta$ is determined. The virtual viewer angle $\theta$ may be selected by the emulator, by the emulation or calculated based on a position of the virtual viewer to a large digital display surface. In some embodiments, the system may pre-determine a plurality of variables (distance, viewing angle, etc.) for each real-world display pixel (pixel on a TV, headset, etc.) for the virtual screen pixel it covers.

In 806, the determined angle $\theta$, is fed to a brightness model for a light element (e.g., LED) to be used in a constructed large digital display. The brightness model will calculate reductions in brightness of each individual LED based on $\theta$ and apply these reductions, if necessary, in 808. For example, the emulation will make these adjustments for each real-world pixel or group of pixels.

Figure 9A:
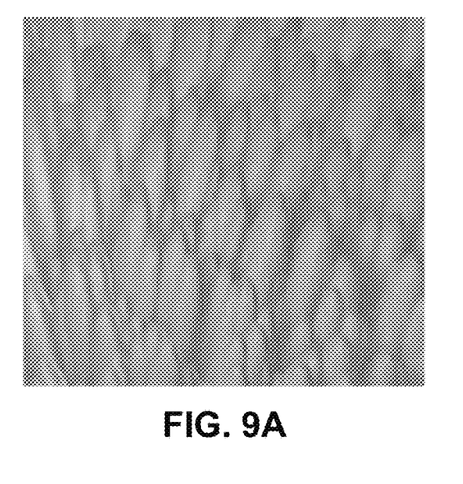
FIG. 9A is an input image to a digital display, according to some embodiments.
Figure 9B:
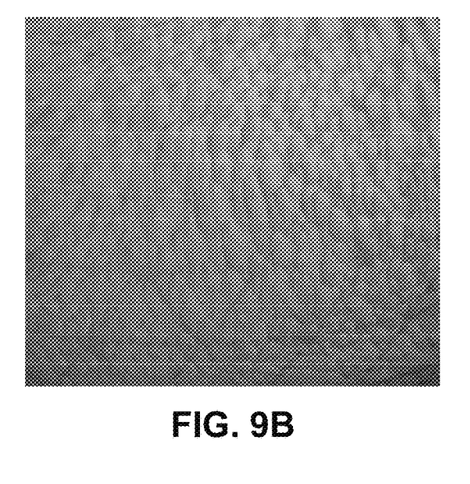
FIG. 9B illustrates the input image shown in FIG. 9A on an emulated screen with $\alpha > \beta$ of a digital display, according to some embodiments.
Figure 9C:
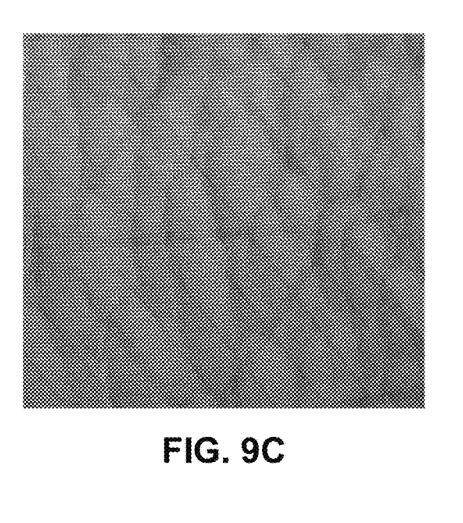
FIG. 9C illustrates the input image shown in FIG. 9A on an emulated screen with $\alpha < \beta$ but $\alpha > \gamma$, according to some embodiments.
Figure 9D:
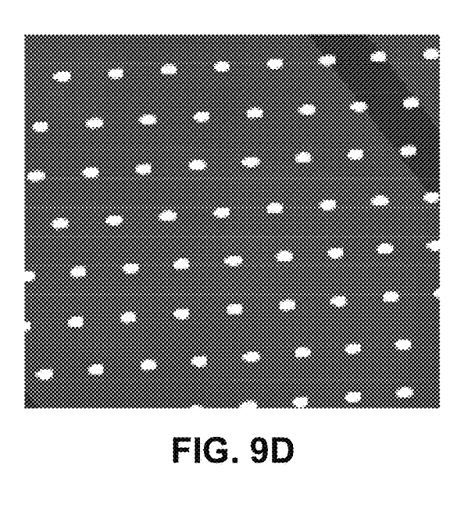
FIG. 9D illustrates the input image shown in FIG. 9A on an emulated screen with $\alpha$ very close to $\gamma$, according to some embodiments.

FIG. 9A illustrates an input image (display content), as per some embodiments. FIG. 9B illustrates the input image shown in FIG. 9A on an emulated screen with $\alpha > \beta$ of a digital display, according to some embodiments. The image appears continuous and unpixellated. FIG. 9C is a pixel map showing the input image shown in FIG. 9A on an emulated screen with $\alpha < \beta$ but $\alpha > \gamma$, according to some embodiments. The individual pixels begin to be visible. FIG. 9D is a pixel map showing the input image shown in FIG. 9A on an emulated screen with $\alpha$ very close to $\gamma$, according to some embodiments. The pixel map is clearly shown with minimal content between emulated pixels.

Figure 10:
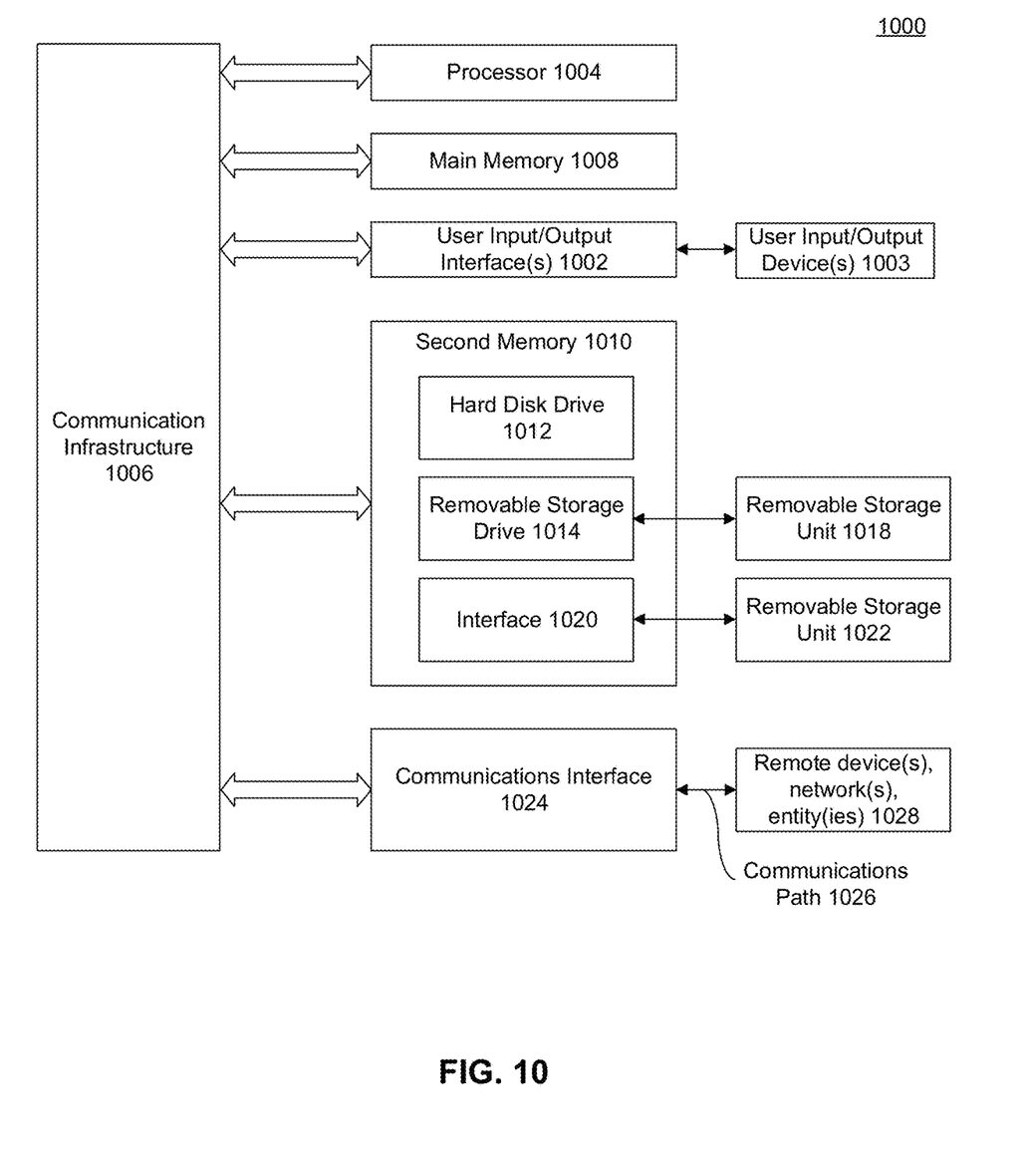
FIG. 10 is an example computer system useful for implementing various embodiments.

Various embodiments may be implemented, for example, using one or more computer systems, such as computer system 1000 shown in FIG. 10. Computer system 1000 may be used, for example, to implement method 600 of FIG. 6 or 800 of FIG. 8. Computer system 1000 may be any computer capable of performing the functions described herein. Computer system 1000 may be any well-known computer capable of performing the functions described herein.

Computer system 1000 includes one or more processors (also called central processing units, or CPUs), such as a processor 1004. Processor 1004 is connected to a communication infrastructure or bus 1006.

One or more processors 1004 may each be a graphics-processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired, and/or wireless, and which may include any combination of LANs, WANs, the Internet, etc. Control logic and/or data may be transmitted to and from computer system 1000 via communication path 1026.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments may operate with software, hardware, and/or operating system implementations other than those described herein.

It is to be appreciated that the Detailed Description section, and not any other section, is intended to be used to interpret the claims. Other sections may set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. An emulator device, comprising:
a memory that stores a pixel map of a digital display, wherein the pixel map identifies a location and spacing of a plurality of pixels representative of a plurality of light emitting elements arranged on a viewable surface of the digital display; and
a processor configured to execute instructions stored in the memory, the instructions, when executed by the processor, configuring the processor to:
generate a distance of a virtual viewer to the viewable surface of the digital display,
emulate the digital display based on the pixel map and the distance of the virtual viewer,
receive digital content,
render the digital content based on the emulated digital display, and
display the rendered digital content on the emulated digital display.

2. The system of claim 1, wherein the instructions, when executed by the processor, further configure the processor to generate an orientation of the virtual viewer relative to the viewable surface of the digital display.

3. The system of claim 2, wherein the orientation comprises a viewing angle between the virtual viewer and the viewable surface of the digital display.

4. The system of claim 3, wherein the instructions, when executed by the processor, further configure the processor, during emulation, to reduce a brightness of at least one of the plurality of light emitting elements on the pixel map based on the viewing angle between the virtual viewer and the viewable surface of the digital display.

5. The system of claim 3, wherein the emulator device is further configured, during emulation, to reduce a brightness of at least one of the plurality of pixels on the pixel map based on the viewing angle between the virtual viewer and the viewable surface of the digital display.

6. The system of claim 5, wherein the brightness is based on a non-linear view angle model.

7. The system of claim 1, wherein the emulator device is further configured to:
determine a distance where the spacing between at least two of the plurality of pixels on the pixel map is no longer visible to a viewer;
determine a distance where the spacing between the at least two of the plurality of pixels on the pixel map is visible to the viewer;
when the distance of the virtual viewer is beyond the distance where the spacing between the at least two of the plurality of pixels on the pixel map is no longer visible to the viewer, render the digital content as a continuous display;
when the distance of the virtual viewer is within the distance where the spacing between the at least two of the plurality of pixels on the pixel map is visible to the viewer, render the digital content on individual pixels; and
when the distance of the virtual viewer is in-between the distance where the spacing between the at least two of the plurality of pixels on the pixel map is visible and the distance where the spacing between the at least two of the plurality of pixels on the pixel map is no longer visible, linearly interpolate between the continuous display and individual pixels.

8. The system of claim 7, wherein the linearly interpolate between the continuous display and individual pixels is based on an interpolation parameter.

9. The system of claim 7, wherein the distance where the spacing between the at least two of the plurality of pixels on the pixel map is visible to the viewer comprises a minimum separable acuity distance.

10. The system of claim 7, wherein the emulator device is further configured to:
generate the distance of the virtual viewer to the viewable surface of the digital display based on a target audience.

11. The system of claim 7, wherein the emulator device is further configured to:
generate the distance of the virtual viewer to the viewable surface of the digital display based on atmospheric conditions.

12. A method for digital display emulation, comprising:
receiving, by a emulator device, a pixel map of a digital display, wherein the pixel map identifies a location and spacing of a plurality of pixels representative of a plurality of light emitting elements arranged on a viewable surface of the digital display;
generating, by the emulator device, a distance of a virtual viewer to the viewable surface of the digital display;
emulating, by the emulator device, the digital display based on the pixel map and the distance of the virtual viewer;
receiving, by the emulator device, digital content;
rendering, by the emulator device, the digital content based on the emulated digital display; and
displaying the rendered digital content on the emulated digital display.

13. The method of claim 12, further comprising:
generating an orientation of the virtual viewer relative to the viewable surface of the digital display, wherein the orientation comprises a viewing angle between the virtual viewer and the viewable surface of the digital display.

14. The method of claim 12, further comprising:
reducing a brightness of at least one of the plurality of light emitting elements on the pixel map based on a viewing angle between the virtual viewer and the viewable surface of the digital display.

15. The method of claim 12, further comprising:
determining a distance where the spacing between at least two of the plurality of pixels on the pixel map is no longer visible to a viewer;
determining a distance where the spacing between the at least two of the plurality of pixels on the pixel map is visible to the viewer;
when the distance of the virtual viewer is beyond the distance where the spacing between the at least two of the plurality of pixels on the pixel map is no longer visible to the viewer, rendering the digital content as a continuous display;
when the distance of the virtual viewer is within the distance where the spacing between the at least two of the plurality of pixels on the pixel map is visible to the viewer, rendering the digital content on individual pixels; and when the distance of the virtual viewer is in-between the distance where the spacing between the at least two of the plurality of pixels on the pixel map is visible and the distance where the spacing between the at least two of the plurality of pixels on the pixel map is no longer visible, linearly interpolating between the continuous display and individual pixels.

16. The system of claim 15, wherein the distance where the spacing between the at least two of the plurality of pixels on the pixel map is visible to the viewer comprises a minimum separable acuity distance.

17. A method for digital display emulation, comprising:
generating, by a emulator device, a pixel map of a digital display, wherein the pixel map identifies a location and spacing of a plurality of pixels representative of a plurality of light emitting elements arranged on a viewable surface of the digital display;
generating, by the emulator device, a distance of a virtual viewer to the viewable surface of the digital display;
generating, by the emulator device, an orientation of the virtual viewer to the viewable surface of the digital display, wherein the orientation of the virtual viewer comprises a viewing angle between the virtual viewer and the viewable surface of the digital display;
emulating, by the emulator device, the digital display based on the pixel map and the distance and the orientation of the virtual viewer;
receiving, by the emulator device, digital content;
rendering, by the emulator device, the digital content based on the emulated digital display; and
displaying the rendered digital content on the emulated digital display.

18. The method of claim 17, further comprising:
reducing a brightness of at least one of the plurality of light emitting elements on the pixel map based on the viewing angle between the virtual viewer and the viewable surface of the digital display.

19. The method of claim 18, further comprising:
deriving the brightness based on a non-linear view angle model.

20. The method of claim 17, further comprises:
determining a distance where the spacing between at least two of the plurality of pixels on the pixel map is no longer visible to a viewer;
determining a distance where the spacing between the at least two of the plurality of pixels on the pixel map is visible to the viewer;
when the distance of the virtual viewer is beyond the distance where the spacing between the at least two of the plurality of pixels on the pixel map is no longer visible to the viewer, rendering the digital content as a continuous display;
when the distance of the virtual viewer is within the distance where the spacing between the at least two of the plurality of pixels on the pixel map is visible to the viewer, rendering the digital content on individual pixels; and
when the distance of the virtual viewer is in-between the distance where the spacing between the at least two of the plurality of pixels on the pixel map is visible and the distance where the spacing between the at least two of the plurality of pixels on the pixel map is no longer visible, linearly interpolating between the continuous display and individual pixels.

* * * * *

UNITED STATES PATENT AND TRADEMARK OFFICE
CERTIFICATE OF CORRECTION

PATENT NO. : 11,727,630 B2  
APPLICATION NO. : 17/490387  
DATED : August 15, 2023  
INVENTOR(S) : Nolan et al.

Page 1 of 1

It is certified that error appears in the above-identified patent and that said Letters Patent is hereby corrected as shown below:

In the Claims

In Column 13, Claim 2, Line 30, delete "system" and insert -- device --, therefor.

In Column 13, Claim 3, Line 34, delete "system" and insert -- device --, therefor.

In Column 13, Claim 4, Line 37, delete "system" and insert -- device --, therefor.

In Column 13, Claim 5, Line 43, delete "system" and insert -- device --, therefor.

In Column 13, Claim 6, Line 48, delete "system" and insert -- device --, therefor.

In Column 13, Claim 7, Line 50, delete "system" and insert -- device --, therefor.

In Column 14, Claim 8, Line 8, delete "system" and insert -- device --, therefor.

In Column 14, Claim 9, Line 11, delete "system" and insert -- device --, therefor.

In Column 14, Claim 10, Line 15, delete "system" and insert -- device --, therefor.

In Column 14, Claim 11, Line 19, delete "system" and insert -- device --, therefor.

In Column 15, Claim 16, Line 8, delete "system" and insert -- method --, therefor.

Signed and Sealed this  
Seventeenth Day of October, 2023

Katherine Kelly Vidal  
*Director of the United States Patent and Trademark Office*